United States Patent
Yang et al.

(10) Patent No.: US 9,696,135 B2
(45) Date of Patent: Jul. 4, 2017

(54) METHOD FOR ANALYZING NESTED OPTICAL CAVITIES

(71) Applicant: Petrospec Engineering Ltd., Sherwood Park (CA)

(72) Inventors: Yi Yang, Vernon, CT (US); Trevor Wayne MacDougall, South Dartmouth, MA (US)

(73) Assignee: PETROSPEC ENGINEERING LTD., Sherwood Park (CA)

( * ) Notice: Subject to any disclaimer, the term of this patent is extended or adjusted under 35 U.S.C. 154(b) by 9 days.

(21) Appl. No.: 14/563,442

(22) Filed: Dec. 8, 2014

(65) Prior Publication Data

US 2015/0168133 A1 Jun. 18, 2015

Related U.S. Application Data

(60) Provisional application No. 61/916,891, filed on Dec. 17, 2013.

(51) Int. Cl.
  *G01D 5/353* (2006.01)
  *G01B 9/02* (2006.01)

(52) U.S. Cl.
  CPC ..... *G01B 9/02044* (2013.01); *G01B 9/02008* (2013.01); *G01B 2290/25* (2013.01)

(58) Field of Classification Search
  CPC ........... G01J 3/26; G01D 5/266; G01D 5/353; G01D 5/35306; G01D 5/35312; G01D 5/35316
  USPC .................................................. 356/454, 480
  See application file for complete search history.

(56) References Cited

U.S. PATENT DOCUMENTS

| | | | |
|---|---|---|---|
| 2005/0046862 A1* | 3/2005 | Melnyk .............. | G01D 5/35303 356/480 |
| 2008/0043245 A1* | 2/2008 | Needham .................. | G01J 5/38 356/480 |
| 2015/0033848 A1* | 2/2015 | Pechstedt ............ | G01L 19/0092 73/497 |

FOREIGN PATENT DOCUMENTS

GB    WO 2013136071 A2 *  9/2013   .........  G01L 19/0092

OTHER PUBLICATIONS

Leslie L. Deck; Measurements using Fourier Transform Phase Shifting Interferometry; Zygo Corporation, Laurel Brook Road, Middlefield, CT 06455-0448.

* cited by examiner

*Primary Examiner* — Jonathan Hansen
(74) *Attorney, Agent, or Firm* — Grogan, Tuccillo & Vanderleeden, LLP

(57) ABSTRACT

An optical sensor apparatus illuminates nested optical cavities by a broadband light source, such as a tunable laser. A composite interference signal is obtained from light reflected from the nested optical cavities, partial interference spectra are recovered from the composite interference signal, cavity depths are measured based on the partial interference spectra, and electrical signals are provided based on the final measured cavity depths.

12 Claims, 5 Drawing Sheets

$$\text{Coarse Thickness} = \frac{nPks * (nPks - 1) * (nPks+1)}{12 * [(nPks+1)*\sum_{i=1}^{nPks} \frac{1}{\lambda_i} - 2*\sum_{i=1}^{nPks} \frac{i}{\lambda_i}]}$$

$(\lambda_1 < \lambda_2 < ... < \lambda_{nPks})$ $$\text{Coarse Thickness} = \frac{nPks * (nPks - 1) * (nPks+1)}{12 * [2*\sum_{i=1}^{nPks} (i * v_i) - (nPks+1)*\sum_{i=1}^{nPks} v_i]}$$

$(v_1 < v_2 < ... < v_{nPks})$

METHOD FOR ANALYZING NESTED OPTICAL CAVITIES

CROSS REFERENCE TO RELATED APPLICATIONS

This application claims the benefit of U.S. Provisional Application Ser. No. 61/916,891, filed on Dec. 17, 2013, which is herein incorporated by reference in its entirety.

BACKGROUND

Technical Field

The present invention relates to fiber optic sensors. Particular embodiments relate to sensors with nested optical cavities utilizing Fabry-Perot interferometry.

Discussion of Art

Fiber optic sensors with nested optical cavities, using Fabry-Perot interferometry, can simultaneously sense multiple measurands and have broadly-recognized industrial applicability.

Nested optical cavities have at least two concatenated cavities 1, 2 that are formed by three or more optical interfaces 3, 4, 5 as shown in FIG. 1. Generally, each two adjacent mediums (FIG. 1) have a different refractive index. Therefore, a portion of incoming light will be reflected back from an interface between two adjacent mediums. For example, an interface 3 at the "front" (input) side of cavity 1 reflects a portion of incoming light as $E_1$. Similarly, $E_2$ and $E_3$ are reflected, respectively, from interfaces 4 and 5 between cavity 1 and cavity 2 and at the rear wall of cavity 2.

If an optical path difference (OPD) between any two of the reflected beams $E_1$, $E_2$, or $E_3$ is within a coherence length of the light source that provides $E_{in}$, then the two beams will generate interference fringes. Typically the OPD values of three different combinations are smaller than the light source coherence length.

Therefore, the multiple optical interfaces 3, 4, 5 will together produce a composite interference signal whose characteristics depend upon the dimensions and refractive indices of the individual cavities 1, 2. FIG. 2, which is a broadband amplitude/wavelength spectrum graph, shows a composite interference signal encoded by the nested optical cavities 1, 2 into the light reflected therefrom.

Several signal demodulation techniques are known for interferometry of a single cavity. For example, Fourier transform method has advantages of fast computation and absolute measurement, but offers low resolution of cavity dimensions. Cross correlation method has drawbacks of either a time-consuming computation, or the requirement of an external analyzing interferometer. Additionally, cross correlation presents a 2 pi phase ambiguity problem, i.e., cavity dimension may be more precise than Fourier but significantly inaccurate. Least-square fitting method has the same limitations as cross correlation, i.e., time-consuming computation and 2 pi phase ambiguity problem. Wavelength tracking method offers high resolution but provides only a relative thickness measurement (i.e., which cavity is thicker?) and small dynamic range (half-wavelength limitation). A modified wavelength tracking method tracks the fringe peak or valley wavelength and the corresponding fringe order by using two fringe peaks or valleys. The modified wavelength tracking method provides absolute measurement for only one cavity demodulation with high resolution but may induce 2 pi phase ambiguity due to noise effect on either of the two fringe peaks or valleys.

Unfortunately there is a dearth of effective and efficient demodulation methods to calculate the thicknesses of nested cavities and the physical measurands. Currently cross-correlation is known to work as a demodulation method for nested cavities when used with an external analyzing interferometer or using time intensive computational software. However, when the difference of the thicknesses of the cavities is small, the problem is severe and the algorithm almost cannot resolve the accurate thicknesses. Computational load can be such as to prohibit cost-effective "real-time" measurement (i.e., measurement that produces a signal indicative of a measurand, during a period of time that the measurand holds a near-constant value).

Accordingly, it is desirable to have an accurate, timely and cost effective method for demodulating optical signals produced by nested cavities.

BRIEF DESCRIPTION

According to the present invention, a novel signal processing method, utilizing broadband light demodulation techniques in combination with a quantifiable broadband light source (e.g., a tunable laser source), provides both high sensitivity and absolute thickness measurements of nested cavities with a large dynamic range.

Aspects of the inventive method include illuminating nested optical cavities with light of a plurality of monitored wavelengths; obtaining a composite interference signal from light reflected from the nested optical cavities; recovering partial interference spectra from the composite interference signal; calculating final measured cavity depths based on the partial interference spectra; and outputting electrical signals based on the final measured cavity depths.

Certain embodiments implement the inventive method in an optical sensor apparatus, which illuminates nested optical cavities by a broadband light source, for example a tunable laser. A composite interference signal is obtained from light reflected from the nested optical cavities, partial interference spectra are recovered from the composite interference signal, cavity depths are measured based on the partial interference spectra, and electrical signals are provided based on the final measured cavity depths.

These and other objects, features and advantages of the present invention will become apparent in light of the detailed description thereof, as illustrated in the accompanying drawings.

DRAWINGS

DETAILED DESCRIPTION OF THE DRAWINGS

Figure 3:
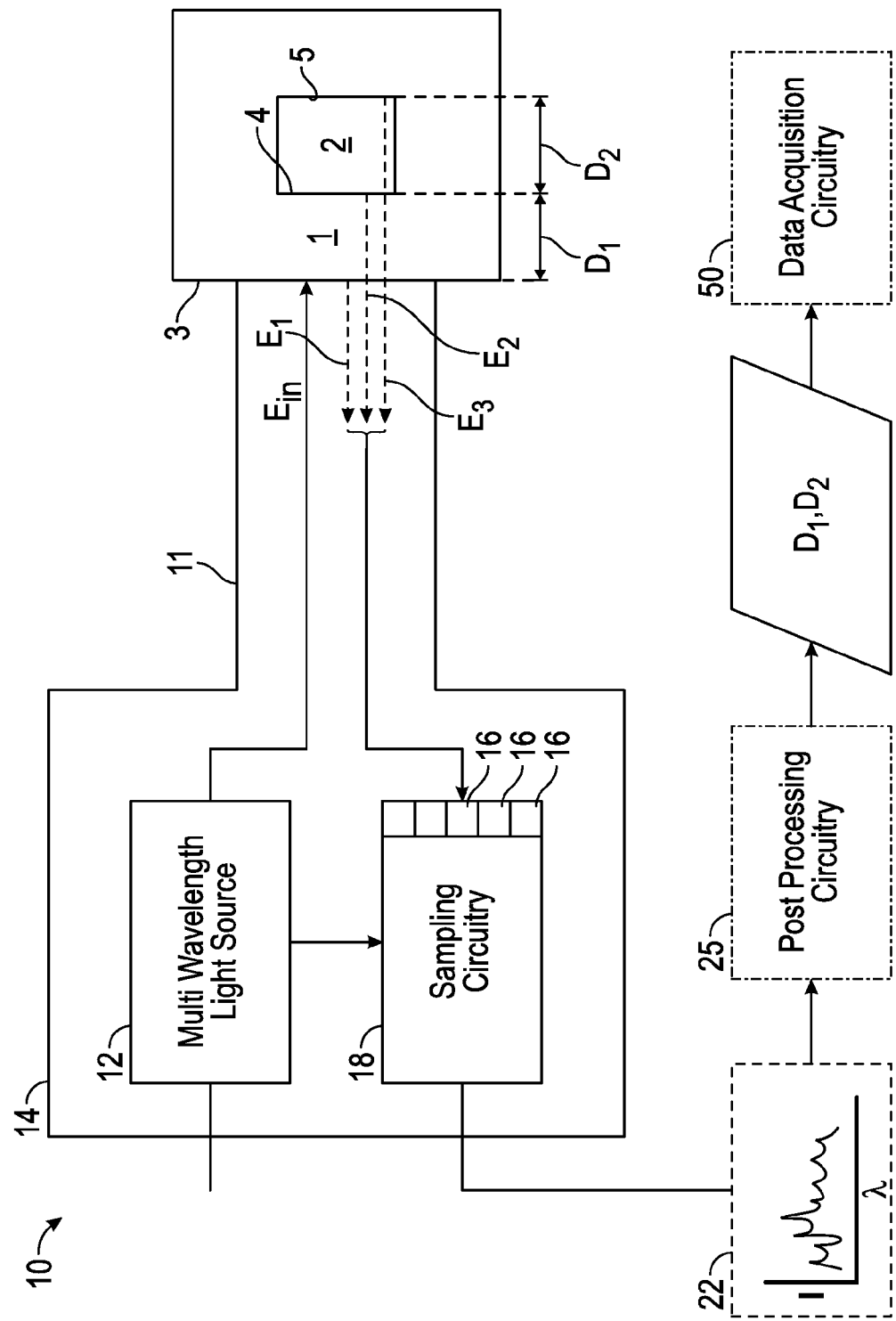
FIG. 3 shows schematically a fiber optic sensor that incorporates nested optical cavities as shown in FIG. 1.

Referring to FIG. 3, a fiber optic sensor apparatus 10 includes two nested cavities, cavity 1 and cavity 2, which are optically connected by a waveguide 11 to a spectral detection module 14 that houses a multi-wavelength light source 12 (e.g., a tunable laser, laser array, or broadband source), a sensor head 16, and sampling circuitry 18. Each cavity 1 or 2 has a respective refractive index different from the other cavity and from an environment E that surrounds the cavities in use. The tunable laser or broadband source 12 emits coherent light $E_{in}$ which impinges onto and is reflected by the interfaces 3, 4, 5 between the environment and cavity 1 ($E_1$), between cavity 1 and cavity 2 ($E_2$), and between cavity 2 and the sensor housing that forms the back wall of cavity 2 ($E_3$). Refracted light $E_1$, $E_2$, $E_3$ then is collected at the spectral detection module 14. For example, the sensor head 16 may include one or more photoelectric devices (e.g., an array of photodiodes, CCD, CMOS, or NMOS optimized for various wavelengths of light across a wavelength spectrum). The sampling circuitry 18 is configured to accumulate light intensity signals 20 that it has obtained from the photoelectric device(s) 16. The light intensity signals 20 measure the responses of the nested optical cavities 1, 2 to the various wavelengths emitted by the tunable laser or broadband light source 12. Via the sampling circuitry 18, the spectral detection module 14 produces an electronic data file 22 of received light intensities 26 versus wavelength bins 24. The electronic data file 22 represents the composite interference signal returned from the nested optical cavities 1, 2.

Figure 2:
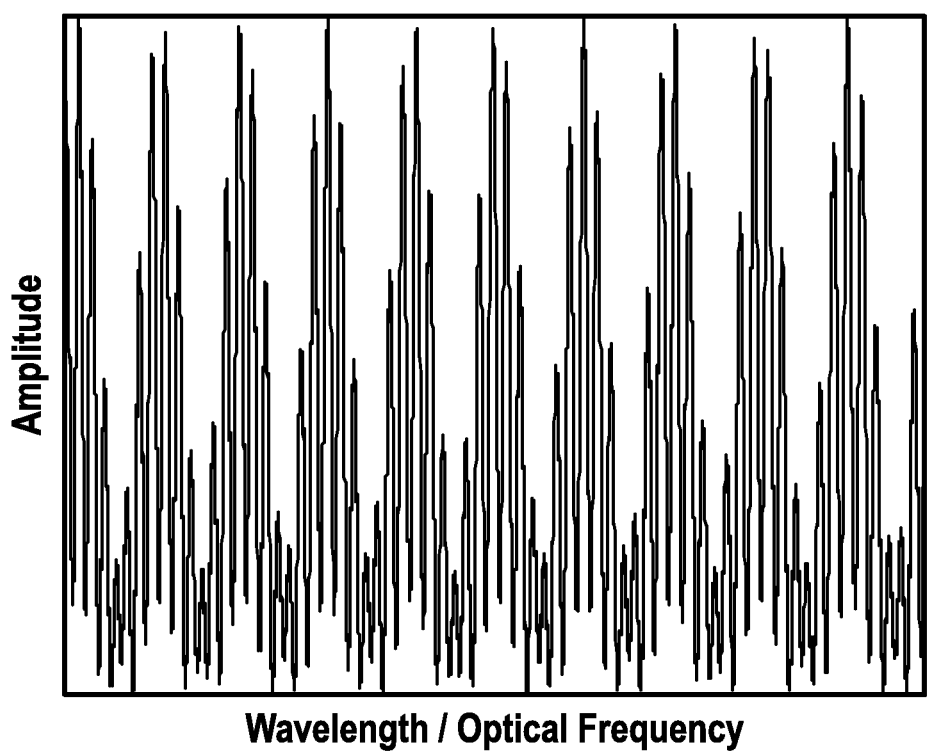
FIG. 2 shows in a graph a broad band interference amplitude spectrum, as produced by the nested optical cavities shown in FIG. 1.

More specifically, the sampling circuitry 18 allocates 21 the light intensity signals 20 among the optical wavelength bins 24 that correspond to concurrent tuning of the tunable laser or broadband source 12. Thus, during a scan of the tunable laser source 12 across a programmed wavelength spectrum, the spectral detection module 18 will accumulate intensity signals 20 into the optical wavelength bins 24 to fill the wavelength spectrum. The end result is that each bin 24 will have an accumulated intensity 26, consistent with what is shown in FIG. 2. The sampling circuitry 18 then passes the electronic data file 22 from the spectral detection module 14 to a post processing module 25. Both the spectral detection module 14 and the post processing module 25 may be implemented in special purpose analog or digital circuitry, in software, in integral or component modules, or in combinations thereof.

Figure 4:
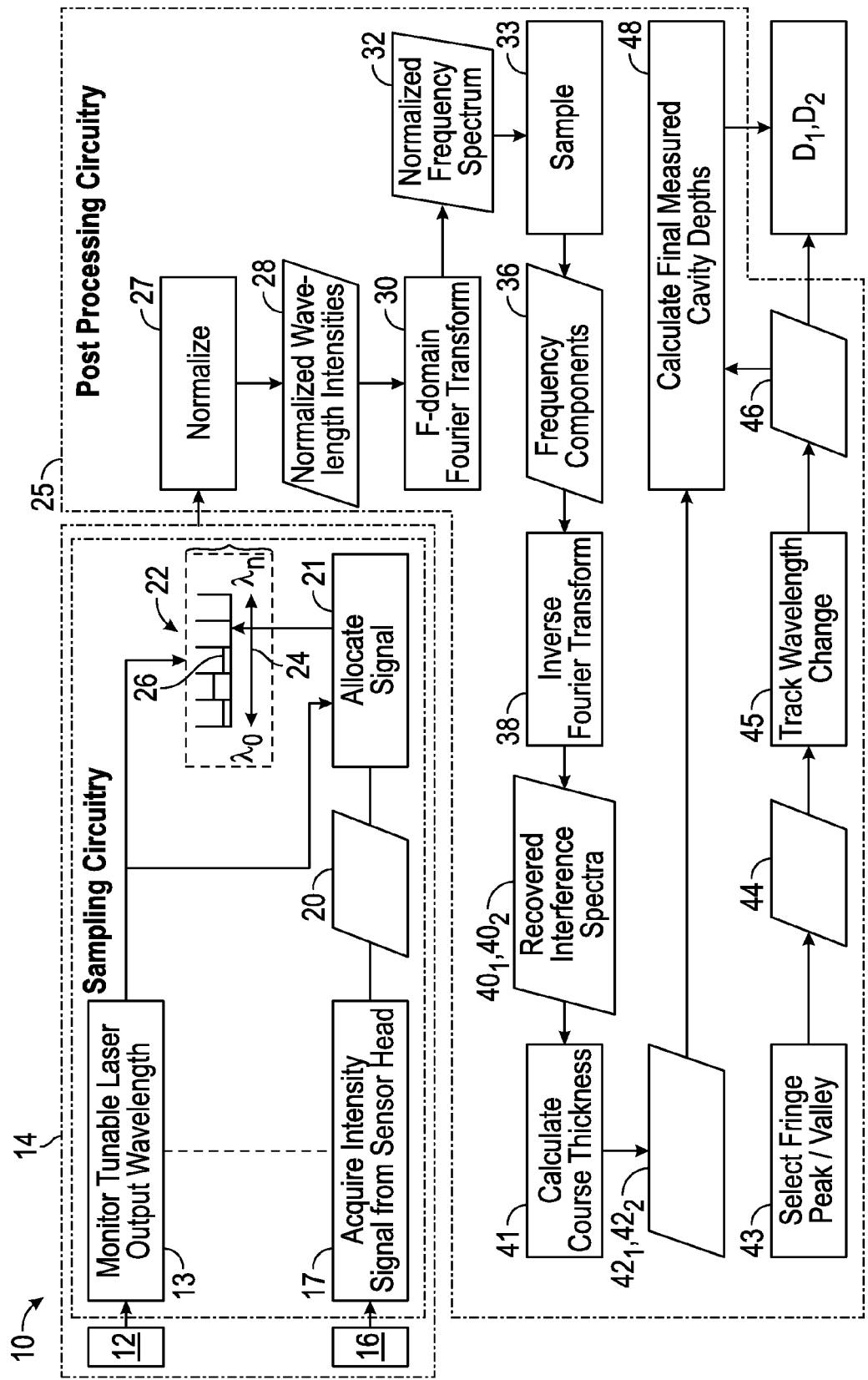
FIG. 4 shows the signal processing flowchart.
Figure 5:
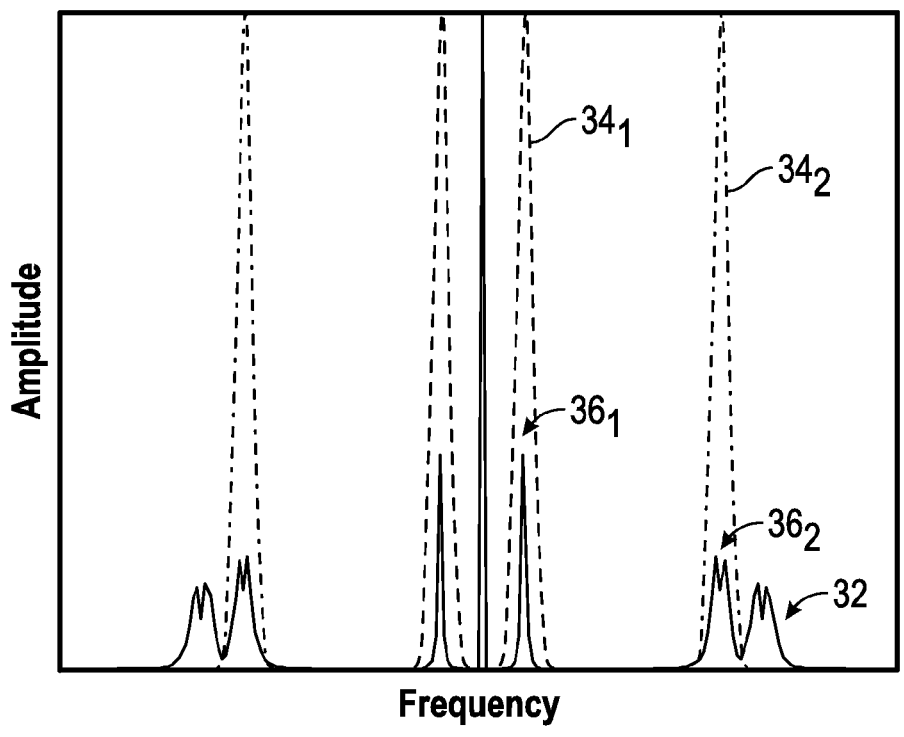
FIG. 5 shows in a graph a frequency spectrum of the interference signal shown in FIG. 2.

Referring to FIG. 4, the post processing circuitry 25 implements an algorithm or method that includes normalizing 27 the accumulated intensities 26 (i.e., a normalized intensity 28 of the "highest" bin is set to 1.0, and normalized intensities of "lower" bins are scaled accordingly) within the electronic data file 22, as well as performing a frequency-domain Fourier transform 30 on the normalized wavelength intensities 28, in order to produce a normalized frequency spectrum 32, as shown in FIG. 5.

Figure 1:
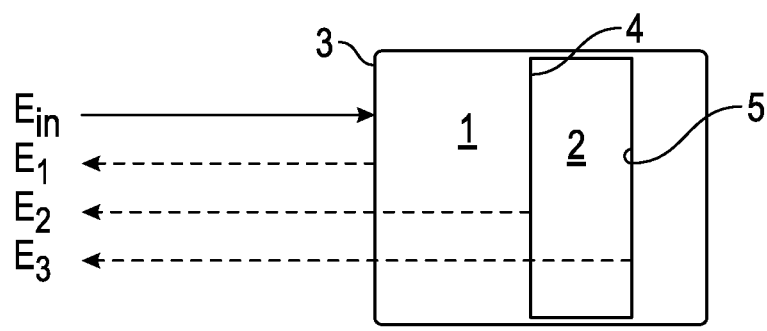
FIG. 1 shows schematically a set of nested optical cavities.

Referring now to FIGS. 4 and 5, the post processing circuitry 25 samples 33 the normalized frequency spectrum 32 using window functions 34, e.g., Gaussian, rectangular, Hamming windows, etc. in order to identify frequency components 36 that are relevant to the thicknesses of the two cavities 1, 2 as shown in FIGS. 1 and 3. For example, FIG. 5 shows two sets of window functions $34._1$ and $34._1$, which respectively correspond to estimates of cavity thickness for the two cavities 1 and 2. The dotted window functions $34._1$ correspond to the short cavity 1 while the dashed window functions $34._2$ correspond to the long cavity 2.

Figure 6A:
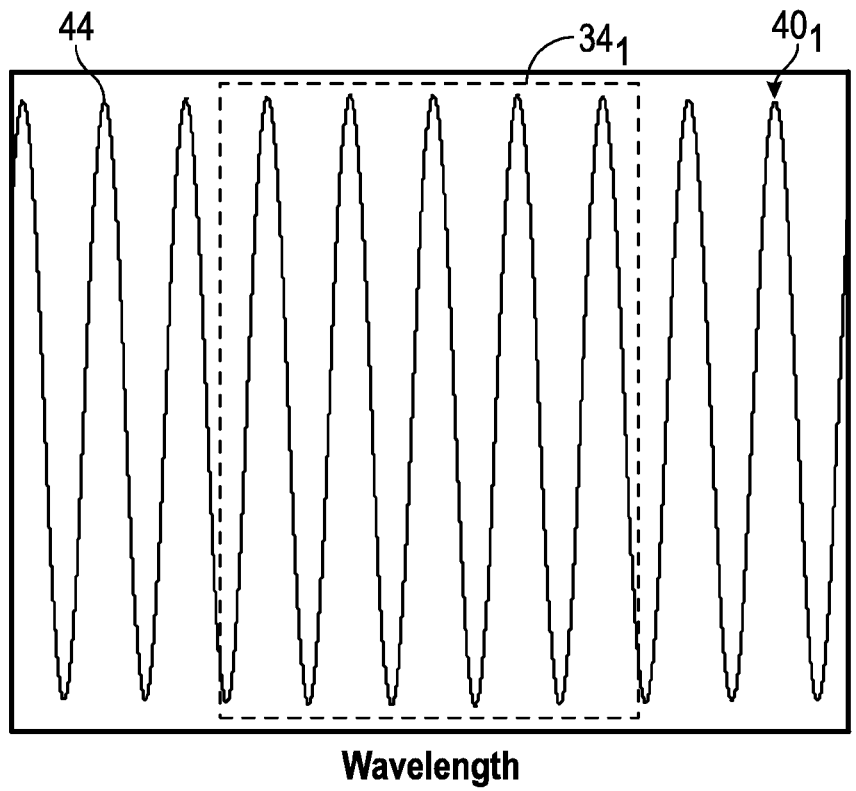
FIGS. 6A-6B show inverse Fourier transforms of the windowed frequencies shown in FIG. 4.
Figures 6B, 7:
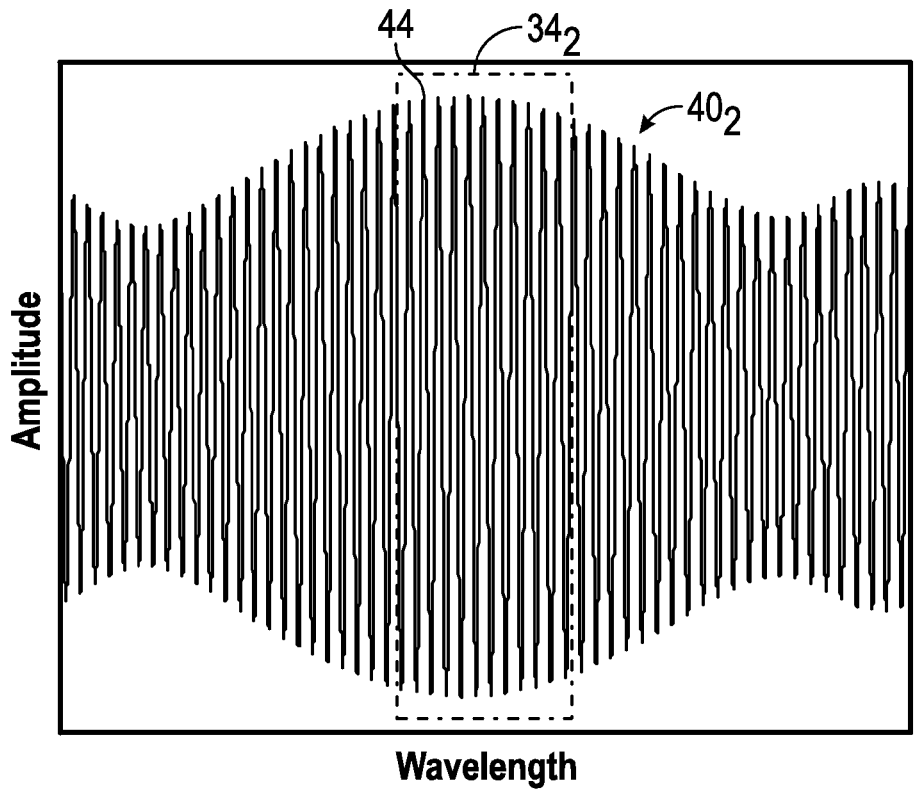
FIG. 7 shows wavelength- and frequency-based functions for coarsely estimating cavity thicknesses.

Referring to FIGS. 4 and 6A-6B, the post processing circuitry 25 then applies inverse Fourier transforms 38 to the windowed frequency components 36, thereby recovering interference spectra 40. FIGS. 6A and 6B respectively show the recovered interference spectra $40._1$ and $40._2$ of the short cavity 1 (from window functions $34._1$ in FIG. 5) and of the long cavity 2 (from window functions $34._2$ in FIG. 5).

Using the multiple fringe peaks/valleys in the full or partial recovered interference spectra 40, the post processing circuitry 25 then calculates 41 coarse thicknesses $42._1$ or $42._2$ for each cavity 1 or 2, using equations as shown in FIG. 7. The post processing circuitry 25 selects 43 a single fringe peak/valley 44 for tracking 45 wavelength change 46 across the recovered spectra 42 as a function of time. In other words, the optical sensor apparatus 10 repeatedly samples the nested cavities 1, 2 using the tunable laser 12 and the sensor head 16, and the post processing circuitry 25 tracks a single peak-amplitude wavelength (e.g., a second-from-the-left peak within one of the windows 34). Finally, the signal processing algorithm 18 calculates 48 final measured cavity depths $D._1$ and $D._2$ based on the coarse thicknesses $42._1$ and $42._2$ and on fine adjust provided by tracking the peak wavelength changes 46. The final measured cavity depths $D._1$ and $D._2$ then can be passed from the signal processing algorithm 18 for further use by data acquisition equipment 50, e.g., for monitoring pressure, temperature, environmental chemical concentrations, or the like.

Thus, the proposed invention incorporates inverse Fourier transform of window filtered frequency components. Also, embodiments of the invention provide for selecting a portion of the full or partial recovered spectrum in wavelength or optical frequency domain. Embodiments of the invention advantageously illuminate nested optical cavities using a wavelength-scanning tunable laser source, thereby enabling signal processing algorithm to combine coarse cavity thickness measurement based on multiple fringe peaks/valleys and single peak/valley wavelength tracking method for fine cavity thickness measurement, thus achieving a measurement technique and apparatus that by comparison to a standard dispersive white light interferometer is more robust, more noise tolerant, and less susceptible to 2 pi phase ambiguity. Moreover, the inventive method provides for independent and simultaneous calculation of multiple cavity thicknesses with fast computation; absolute measurement; high resolution; and reduced sensitivity to 2 pi phase ambiguity problem.

Advantageously, embodiments of the invention enable real time measurement of the thicknesses of nested optical cavities, i.e., during transients the electrical signals output by the post processing module 25 indicate direction of change of the thicknesses of the nested optical cavities 1, 2 and at steady state the electrical signals output by the post processing module 25 indicate the thicknesses of the nested optical cavities 1, 2.

Although exemplary embodiments of the invention have been described with reference to attached drawings, those skilled in the art nevertheless will apprehend variations in form or detail that are consistent with the scope of the invention as defined by the appended claims.

What is claimed is:

1. An optical sensor apparatus comprising:
  nested optical cavities;
  a multi-wavelength light source;
  a waveguide operatively connected from the multi-wavelength light source to a first and a second nested optical cavities for delivering illuminating light into the nested optical cavities and receiving reflected light from the cavities;
  a spectral detection module operatively connected to receive reflected light from the waveguide, and configured to develop an electronic data file representation of a composite interference signal encoded by the nested optical cavities in the reflected light, the electronic data file including one or more light intensity signals of the composite interference signal; and a post processing module configured to:
  receive the electronic data file from the spectral detection module;
  select a subset of the light intensity signals corresponding to a window;
  recover partial interference spectra via applying an inverse Fourier transform based on at least one of amplitude peaks and magnitude peaks within the wavelength domain to the subset of light intensity signals;
  calculate final measured cavity depths based on the partial interference spectra in the wavelength domain utilizing at least one of wavelength amplitude and wavelength magnitude; and
  output the final measured cavity depths as electrical signals.

2. The optical sensor apparatus as claimed in claim 1, wherein calculation of final measured cavity depths includes coarse thickness calculation based on wavelength peaks and fine thickness calculation based on wavelength tracking.

3. The optical sensor apparatus as claimed in claim 1, wherein the multi-wavelength light source is a tunable laser.

4. The optical sensor apparatus as claimed in claim 1, wherein the multi-wavelength light source is a laser array.

5. The optical sensor apparatus as claimed in claim 1, wherein the multi-wavelength light source is a broadband source.

6. The optical sensor apparatus as claimed in claim 1, wherein the spectral detection module and the post-processing module are implemented in software on a generic processor.

7. The optical sensor apparatus as claimed in claim 1, wherein the spectral detection module and the post processing module are configured to output the final measured cavity depths in real time.

8. A method for optically measuring the depth of nested optical cavities, comprising:
  illuminating the nested optical cavities with light of a plurality of monitored wavelengths;
  obtaining a composite interference signal from light reflected from the nested optical cavities, the composite interference signal including one or more light intensity signals;
  selecting a subset of the light intensity signals corresponding to a window;
  recovering partial interference spectra via applying an inverse Fourier transform based on at least one of amplitude peaks and magnitude peaks within the wavelength domain to the subset of light intensity signals;
  calculating final measured cavity depths based on the partial interference spectra the wavelength domain utilizing at least one of wavelength amplitude and wavelength magnitude; and
  outputting electrical signals based on the final measured cavity depths.

9. The method as claimed in claim 8, wherein calculation of final measured cavity depths includes coarse thickness calculation based on wavelength peaks and fine thickness calculation based on wavelength tracking.

10. The method as claimed in claim 8, wherein the nested optical cavities are illuminated using a tunable laser.

11. The method as claimed in claim 8, wherein the nested optical cavities are illuminated using a laser array.

12. The method as claimed in claim 8, wherein the nested optical cavities are illuminated using a broadband source.

* * * * *